Feb. 3, 1959  C. E. WOODRUFF  2,871,600
SLIDE MOUNT
Filed April 17, 1958
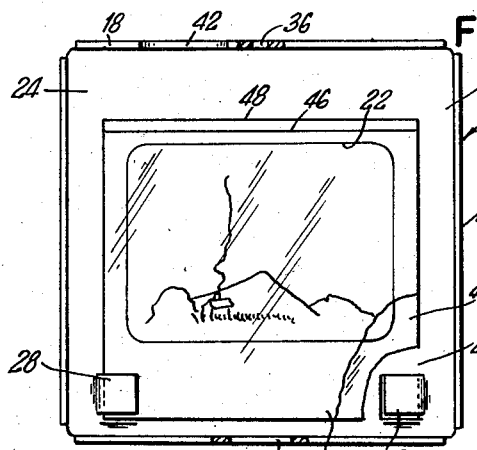
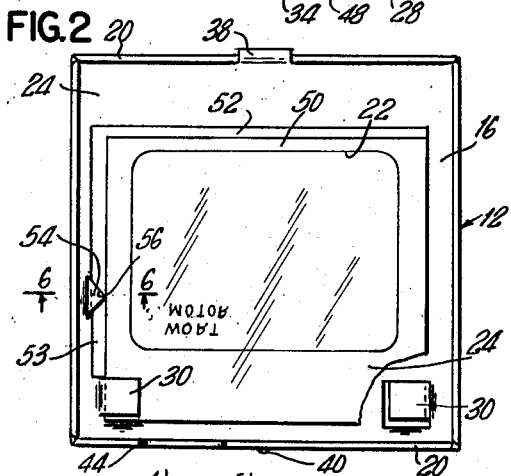
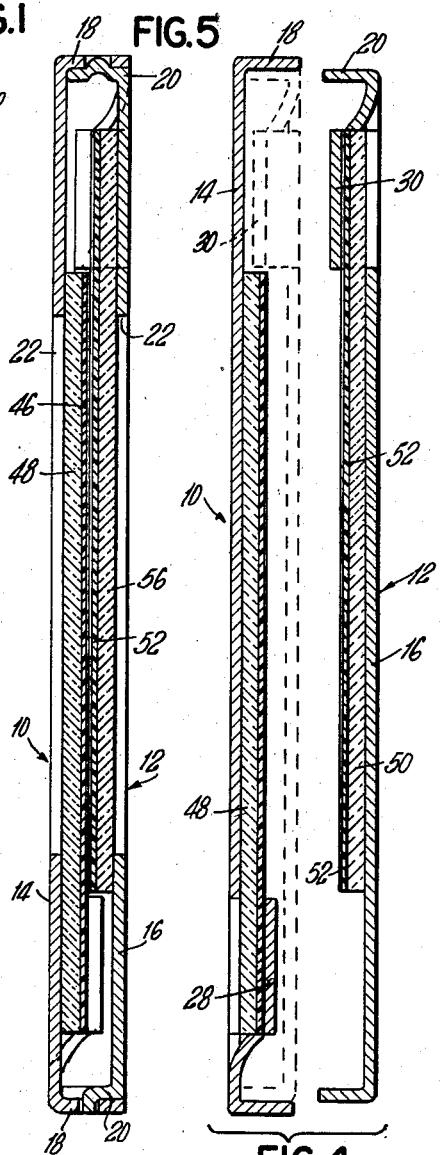
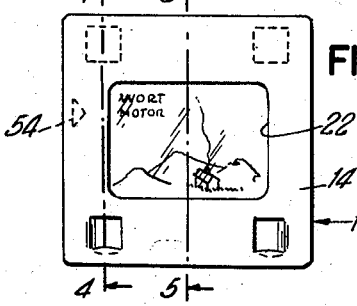
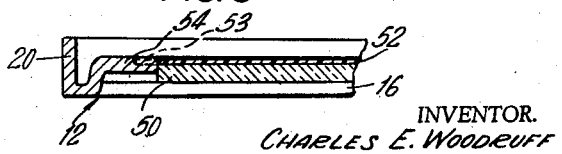
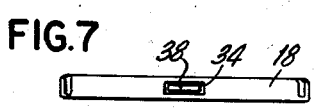
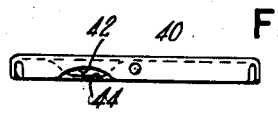
INVENTOR.
CHARLES E. WOODRUFF
BY
ATTORNEY

United States Patent Office 2,871,600
Patented Feb. 3, 1959

2,871,600

SLIDE MOUNT

Charles E. Woodruff, New York, N. Y., assignor to Television Mat Service Corp., New York, N. Y., a corporation of New York Application April 17, 1958, Serial No. 729,137

14 Claims. (Cl. 40—152)

The present invention relates to a mounting for transparent photographic slides, especially to a slide mount suitable for holding such slides in a projector, such as a television projector, and particularly to a mount for holding juxtaposed transparencies having complementary images for the purpose of projecting a composite of their images.

The slide mount of the present invention will be especially useful in advertising over television. In such advertising, slides are often used to illustrate a product or the use of a product or the rendering of a service by a person. Such slides are generally distributed by the advertiser to numerous television broadcasting stations of one or more television chains, usually quite remote from the source where the advertising slide originates. Such display advertising frequently requires to be modified or supplemented, as for reasons of local or seasonal interest. One example of such need for supplementation of a basic advertising slide is the listing of a local dealer for the product or service advertised. Heretofore, such supplementation or modification of an advertising slide or transparency, whether necessitated by reason of local interest or needs, or for some other useful purpose, required the preparation of a separate, entirely new slide for each such modification. Such requirements generally rendered the preparation and use of slides for advertising over multiple broadcasting stations of one or more television networks relatively complicated, involved, troublesome and expensive, because of the need for reproducing the original slide in numerous modified versions.

Another use for the slide mount of the present invention is for photographers generally, who, having made one or more slides, may desire to have the same titled at a later date. Heretofore, no practical, convenient way for accomplishing this purpose was available with reproduction of the original slide.

The present invention is directed to a method and means whereby a base or principal slide or, rather, the picture projected therefrom, may be supplemented or altered without the need for reproducing the basic slide.

Generally stated, the invention consists in the use or the projection, simultaneously, of a pair of juxtaposed transparencies, each having a photographic image, one of which may be the principal image, that is complementary of or additive to the image of the other, to provide a composite projected picture. And the present invention is directed to a holder or mount for a pair of juxtaposed slides or transparencies for their simultaneous projection on a screen.

It is an object of the present invention to provide a slide mount of the character described in which one or both of the slides may be readily and easily inserted and removed so that either one of the slides may be readily and easily combined with various other complementary slides or may be used alone.

It is also an object of the present invention to provide a slide mount of the character described in which the transparencies are held in a manner and in position whereby the blurring of the projected composite picture due to variations of focus of the two transparencies is substantially completely avoided.

It is another object of the present invention to provide a slide mount of the character described in which the several slides are securely held in place against relative shifting to ensure the accuracy of the picture projected therethrough.

It is still another object of the present invention to provide a slide mount of the character described in which the slides are held safely against damage, to thereby preserve them for a longer useful life.

It is a further object of the present invention to provide a slide mount of the character described having a minimum bulk that is readily insertable into positioning slots of the conventional projecting instrument.

It is a still further object of the present invention to provide a slide mount of the character described the parts of which may be easily separated for disassembly and replacement of slides and yet safely and securely locked into place upon one another.

It is yet a further object of the present invention to provide a slide mount of the character described which is of simple construction and may be readily and economically mass-produced of relatively cheap materials.

The foregoing and other objects and advantages of the slide mounts of the present invention will become more readily apparent to those skilled in the art from the preferred embodiment thereof shown in the accompanying drawing and from the following description thereof. It is to be understood, however, that such embodiment is shown by way of illustration only, to make the principles and practice of the invention more readily comprehensible, and without any intent of limiting the invention to the specific details therein shown.

In the drawings:

Fig. 1 is a plan view of the interior of one frame member of a slide mount of the present invention with a basic transparency and a protecting pane mounted thereon, with the transparency and pane partly broken away, to show details of their arrangement and mounting;

Fig. 2 is a plan view of the interior of the other frame member of the mounting, with a protecting pane and supplementary transparency mounted in place, and shown in upside-down relation to the pane and transparency of the frame section shown in Fig. 1;

Fig. 3 is a plan view, on a reduced scale, of an assembled slide mount and slides;

Fig. 4 is a section taken on line 4—4 of Fig. 3, with the frame members shown in spaced relation from one another;

Fig. 5 is a section taken on line 5—5 of Fig. 3, with the frame members shown interfitted and interlocked;

Fig. 6 is a fragmentary, enlarged section taken on line 6—6 of Fig. 2;

Fig. 7 is a view of one end of the assembled slide mount of Fig. 3; and

Fig. 8 is a view of the opposed end of the slide mount of Fig. 3.

Referring now, in greater detail, to the embodiment of the invention illustrated in the drawings, the same comprises a pair of tray-shaped, preferably rectangular frame members 10 and 12, including a first frame member 10 and a second frame member 12. The frame members 10 and 12 each consists of a wall, 14, and 16, respectively, and relatively narrow flanges, 18 and 20, respectively, extending at right angles to such wall from each edge thereof. The wall of one of the frame members, as of frame member 12, may be of slightly smaller dimensions so that its flanges, 20, may fit snugly within the flanges of the other of the frame member 10.

Each of the walls 14 and 16 is formed with a central, preferably rectangular display opening, 22, with such openings arranged to be in substantial register with one another. The frame members 10 and 12 are of such dimensions and their openings 22 are of such size and so arranged that substantial marginal wall portions or borders are provided on two opposed sides of the opening, preferably above and below the same, as indicated at 24 and 26, respectively, on each of the frame members 10 and 12.

Each of the frame members 10 and 12 is provided with a pair of spaced, inwardly extending, pane and transparency-holding facing tabs, 28 and 30, respectively, preferably struck out from one of its border portions, opposed to that of the other. Thus, frame member 10 has its holding and positioning tabs 28 in its border portion 24, said tabs being spaced a distance greater than the adjacent dimension of the projection opening 22, while the frame member 12 has its pair of positioning and holding tabs 30 struck out from its border portion 26. The holding tabs in each of the two sets are preferably equally spaced from one another and also spaced a distance from the adjacent edge of the associate projection opening 22.

The larger of the frame members, 10, is provided, in one side flange thereof, with a slot, 34, and in its opposed side flange with a small detent aperture or recess, 36. The smaller of the frame members, 12, is provided in the flange thereof corresponding to the slotted flange of the frame member 10, with an outwardly offset tongue, 38, that is adapted to fit and engage within the slot 34, and in its opposed side flange with a detent projection, 40, that will engage within the detent hole or recess 36 in the flange of frame member 10. The two detent flanges of the two frame members may each be formed with a cut-out, 42 and 44, respectively, forming a thumb opening for use in separating the two frame members, when desired.

In use, one of the frame members, as 10, may serve as to mount a principal film, 46, which, with an associate protective glass pane, 48, is held in place by the tabs 28; the pane 48 being disposed against the inner face of the wall 14 and the film 46 disposed with its gelatin face outwardly on top of the pane 48. In the embodiment illustrated, the tabs 28 will prevent the sideward shifting of the pane and film. To prevent vertical shifting, both pane and film may be extended, if desired, to the adjacent flange 18, below, or the tabs may be so formed or may have associated means, of a nature that will be readily understood, to provide a bottom stop for the pane and film to be retained therein. Generally, the frame member 10 being made of metallic or synthetic plastic material, the struck-out tabs 28 will have sufficient inherent resilience to frictionally hold such pane and film in place.

The second frame member, 12, may have another pane, 50, and a supplementary or auxiliary film, 52, similarly held in place therein by its tabs 30; with the film 52 also disposed with its gelatin face outwardly. For the last purpose, such auxiliary film 52 may be in the form of a reversed negative. Both of the panes, 46 and 50, and the films 48 and 52, are of such height that the edges of their free ends reach to only a short distance above the contiguous edge of the opening 22.

The slide mount of the invention is assembled by inserting the tongue 38 of the frame member 12 into the slot 34 of the frame member 10, and then snapping the detent projection 40 into the detent recess 36. It will be apparent that when the two frame members are thus inter-engaged, the panes in the two frame members 10 and 12 will overlap, with the tabs 28 of the frame member 10 overlying the free edge of the pane 50 of frame member 12, and the tabs 30 of frame member 12 overlying the free edge of the pane 48 of frame member 10, to thereby minimize the thickness of the slide mount of the present invention, so that it will not exceed the conventional slide mount thickness to any appreciable degree.

It will be apparent that by the arrangement of the two films 48 and 52 with their gelatin sides facing, their effective surfaces will be equally spaced from the projector lenses and will be in substantially equal focus to an extent to practically eliminate any difference in their projected images.

In order to facilitate the assembly of the auxiliary film 52, so that it will be in proper relation relative to the principal film, when the frame members are assembled; that is, with its gelatin side outwardly disposed and with its image properly oriented, appropriate markers may be provided on the frame member 12, which holds the auxiliary film, and on the auxiliary film itself. This may take the form illustrated in the drawing, consisting of an inwardly struck-out guide dart, 54, in a side border of the opening 22 of the frame member 12, and facing the same, either above or below the center point of such opening, and a corresponding indentation, 56, cut out in the appropriate edge of the film 52, as in the marginal portion, 53, provided on the film 52, extending to the side of its underlying pane 50. The indentations in the film may be prefabricated at its point of production to facilitate the assembly of the slide at the point of projection. It may here be stated, however, that any other film-positioning guide means suitable for the purpose may be used.

It will also be apparent that, while the slide mount of the present invention is particularly adapted for use in mounting a plurality of slides, it is just as suitable for use with a single slide and is, therefore, of universal utility.

This completes the description of the slide mount of the present invention and the manner of its use. It will be readily apparent that such slide mount is highly effective, efficient and advantageous for its purposes. It will also be apparent that numerous modifications and variations may be made therein in accordance with the principles and practice of the invention hereinabove set forth, and without the exercise of any inventive ingenuity. I desire, therefore, to be protected for any and all such modifications and variations that may be made within the spirit of the invention and the scope of the claims hereto appended.

What I claim is:

1. A slide mount of the character described comprising a pair of frame members, each including a flat wall section, each of said wall sections having formed an opening therein, said opening having an edge thereof spaced a distance from the contiguous wall edge to provide a relatively wide border between said opening and said edge, means provided on said border on each of said frame members for positioning and holding a film and a protective pane, and cooperating means on said frame members for separably interengaging the same with their openings in register and with their said positioning means facing one another and disposed to different sides thereof.

2. The slide mount of claim 1, wherein said positioning means are disposed on opposed sides of said registering openings.

3. A slide mount of the character described comprising a pair of frame members each including a side wall and peripherally disposed shallow flanges at right angles to the side wall, one of said frame members having its flanges fitting within the flanges of the other of said frame members, each of said side walls having a slide viewing opening formed therein in register with that of the other, the wall of each of said frame members having a border on two sides of the opening thereof; each of said frame members having inwardly projecting means for engaging and supporting a film and a protecting pane formed in one of said borders thereof, said engaging means arranged to be disposed at different sides of said openings when said frame members are interfitted.

4. The slide mount of claim 3, wherein means are provided for separably interlocking said frame members in interfitted position.

5. A slide mount of the character described comprising a pair of frame members each including a side wall and peripheral shallow flange sections at right angles to said wall at the edges thereof, the flange sections of one of said frame members fitting within the flange sections of the other of the said frame members, said side wall having a slide-viewing opening formed therein in register with that of the other wall; each of said frame members having a relatively wide border on two opposed sides of the opening thereof, and each of said frame members having inwardly projecting means for engaging and supporting a film and a protecting pane formed in a border thereof, said engaging means arranged to be disposed at opposed sides of said opening when said frame members are interfitted.

6. A slide mount of the character described comprising a pair of frame members each including a flat wall portion having perpendicularly disposed, relatively shallow flanges along the edges thereof, with the flanges of one of said frame members interfitting within the flanges of the other, each of said flat walls having a slide-viewing opening formed therein in register with that of the other and having marginal borders on opposed sides of said viewing opening, each of said frame members having inwardly extending slide-engaging means on one of its borders, and cooperating means on said frame members for interengaging the same with the slide engaging means of one of said members disposed to the opposed side of said slide-viewing openings from that of the slide-engaging means of the other of said members.

7. A slide mount of the character described, comprising a pair of frame members, each including a flat wall section having an opening formed therein, said opening having opposed edge portions thereof spaced at a distance from their contiguous wall edges to provide a relatively wide border between said opening and said opposed edges, means provided in one of said borders of each of said frame members for positioning and holding a film and a protective pane, cooperating means on said frame members for separably interengaging the same with their openings in register and with their said positioning means to opposed side of said openings, a pane disposed within each of said positioning means, with the pane in one of said positioning means terminating short of the positioning means of the other of said frame members.

8. A slide mount of the character described, comprising a pair of rectangular flat frame members each having an upstanding flange on the edges thereof, one of said frame members having its flanges fitting snugly within the flanges of the other of said frame members, each of said frame members having a viewing opening formed therein in register with the opening of the other, each of said openings having opposed edge portions spaced from the contiguous opposed edges of its frame member to provide a relatively wide border between said opening and said opposed edge, means provided on the inner face of one of the borders of each of said interfitted frame members facing the other border of the other of said frame members for positioning and retaining a protective pane and a film, the pane held in the positioning means of one of said frame members, terminating short of the pane-positioning means of the other of said frame members, and cooperating means on the opposed flanges of said frame members for separably inter-engaging the same in inter-fitting position.

9. The slide mount of claim 8, wherein said pane and film-positioning means comprises a pair of spaced tabs struck out from the border portions of said frame member walls and inwardly and laterally disposed relative to said wall.

10. The slide mount of claim 8 wherein said cooperating, inter-engaging means comprises interlocking means on one pair of adjacent flanges of said interfitted frame members and resilient detent means on the opposed pair of adjacent flanges of said interfitted frame members.

11. The slide mount of claim 8, wherein said cooperating inter-engaging means comprises an outwardly offset tongue on a flange of one of said frame members and a receiving slot for said tongue on the corresponding flange of the other of said frame members, a detent recess on the opposed flange of one of said frame members and a detent projection on the corresponding opposed flange of the other of said frame members.

12. The slide mount of claim 8, wherein said cooperating inter-engaging means comprises an outwardly offset tongue on a flange of one of said frame members and a receiving slot for said tongue on the corresponding flange of the other of said frame members, a detent recess on the opposed flange of one of said frame members and a detent projection on the corresponding opposed flange of the other of said frame members, and wherein said last-named pair of flanges are each provided with a cut-out in the edge thereof in register with that of the other, adapted to serve as thumbnail receiving openings for separating said frame members from one another.

13. The slide mount of claim 8, wherein one of said frame members is formed with index means on its inner surface along a side of said opening thereof other than said borders for orienting the film mounted therein, said index means disposed at a point to one side of the center of said opening.

14. A device for use in the projection of images on a screen, comprising a pair of frame members each including a flat wall section having a slide viewing opening formed therein, said opening having opposed edge portions spaced at a distance from the contiguous opposed edges of said wall member to provide borders between said openings and said opposed edges, means for positioning and holding a film and a protective pane provided on one of said borders of each of said frame members, means separably interengaging said frame members with said opening in register and with the positioning means of each of said frame members facing the other of said frame members and disposed to the opposed side of said registering opening from that of the positioning means of the other of said frame members, each of said frame members having a protective pane and a film held within the positioning means thereof, with said film on the outside of said protective pane and its gelatin surface outwardly disposed, with the pane and film held in each of said frame members terminating short of the positioning means of the other of said frame members.

References Cited in the file of this patent

UNITED STATES PATENTS

| | | |
|---|---|---|
| 2,176,283 | Whiteford | Oct. 17, 1939 |
| 2,697,889 | Heim | Dec. 28, 1954 |
| 2,806,309 | Goldberg | Sept. 17, 1957 |